United States Patent
Wang

(10) Patent No.: US 9,603,154 B2
(45) Date of Patent: Mar. 21, 2017

(54) METHOD FOR TRANSMITTING DATA SIGNAL AND USER EQUIPMENT

(71) Applicant: Huawei Technologies Co., Ltd., Shenzhen (CN)

(72) Inventor: Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 14/792,362

(22) Filed: Jul. 6, 2015

(65) Prior Publication Data

US 2015/0382366 A1     Dec. 31, 2015

Related U.S. Application Data

(63) Continuation of application No. PCT/CN2014/081024, filed on Jun. 27, 2014.

(51) Int. Cl.
*H04W 4/00* (2009.01)
*H04W 72/08* (2009.01)
(Continued)

(52) U.S. Cl.
CPC ......... *H04W 72/082* (2013.01); *H04W 8/005* (2013.01); *H04W 24/08* (2013.01);
(Continued)

(58) Field of Classification Search
CPC . H04W 72/1273; H04W 88/02; H04W 72/08; H04W 8/005; H04W 56/00252
See application file for complete search history.

(56) References Cited

U.S. PATENT DOCUMENTS

2009/0135972 A1   5/2009   Tanaka et al.
2012/0149428 A1   6/2012   Yang
(Continued)

FOREIGN PATENT DOCUMENTS

CN   101547033 A   9/2009
CN   103108389 A   5/2013
(Continued)

OTHER PUBLICATIONS

"Control for D2D Broadcast Communication," Agenda Item: 7.2.7.1.2, Source: Qualcomm Incorporated, Document for: Discussion/Decision, 3GPP TSG-RAN WG1 #76BIS, R1-141448, Shenzhen, China, Mar. 4-Apr. 4, 2014, 7 pages.

*Primary Examiner* — Chi H Pham
*Assistant Examiner* — Alexander O Boakye
(74) *Attorney, Agent, or Firm* — Slater Matsil, LLP

(57) ABSTRACT

Embodiments of the present invention provide a method for transmitting a data signal and a user equipment, where the method includes: acquiring, by a first user equipment, a scheduling assignment signal sent by a second user equipment and a scheduling assignment signal sent by at least one third user equipment, where the second user equipment is a user equipment that performs D2D communication with the first user equipment; determining, by the first user equipment, a first time adjustment amount according to a time adjustment amount included in the acquired scheduling assignment signal; and receiving, by the first user equipment according to the first time adjustment amount and subframe information that is included in the scheduling assignment signal sent by the second user equipment, a data signal sent by the second user equipment.

9 Claims, 5 Drawing Sheets

(51) Int. Cl.
    *H04W 8/00*          (2009.01)
    *H04W 24/08*        (2009.01)
    *H04W 28/12*        (2009.01)
    *H04W 56/00*        (2009.01)
    *H04W 72/12*        (2009.01)
    *H04W 88/02*        (2009.01)

(52) U.S. Cl.
    CPC ....... *H04W 28/12* (2013.01); *H04W 56/0025* (2013.01); *H04W 72/1273* (2013.01); *H04W 72/1278* (2013.01); *H04W 88/02* (2013.01)

(56) References Cited

U.S. PATENT DOCUMENTS

| | | | |
|---|---|---|---|
| 2012/0243510 A1* | 9/2012 | Takano | H04W 74/004 370/331 |
| 2013/0322413 A1 | 12/2013 | Pelletier et al. | |
| 2014/0086158 A1 | 3/2014 | Tavildar et al. | |
| 2015/0341975 A1* | 11/2015 | Wang | H04W 28/044 370/329 |

FOREIGN PATENT DOCUMENTS

| | | |
|---|---|---|
| CN | 103874187 A | 6/2014 |
| JP | 2016526362 A | 9/2016 |
| KR | 20130085357 A | 7/2013 |
| KR | 20140011024 A | 1/2014 |
| WO | 2007049547 A1 | 5/2007 |
| WO | 2010148532 A1 | 12/2010 |
| WO | 2013191424 A1 | 12/2013 |

\* cited by examiner

METHOD FOR TRANSMITTING DATA SIGNAL AND USER EQUIPMENT

This application is a continuation of International Application No. PCT/CN2014/081024, filed on Jun. 27, 2014, which is incorporated herein by reference in its entirety.

TECHNICAL FIELD

The present invention relates to the field of communications technologies, and in particular, to a method for transmitting a data signal and a user equipment (User Equipment, UE for short).

BACKGROUND

In recent years, wireless communications technologies have greatly developed, and an existing commonly used wireless communications network includes a cellular network. In a cellular network, when a data packet is transmitted between two UEs between which a transmission distance is relatively long, the data packet needs to be transmitted from a transmit end to a base station and then transmitted from the base station to a receive end. In the foregoing transmission process, two air interface resources need to be occupied. When a transmission distance between two UEs is relatively short, in order to save an air interface transmission resource and reduce an overhead of control signaling of a base station, communication may be performed in a device-to-device (Device to Device, D2D for short) manner, that is, communication is directly performed between UEs and forwarding by a base station is not required.

When D2D communication is performed between UEs, two types of signals generally need to be sent: a first type of signal is a scheduling assignment (Scheduling Assignment, SA for short) signal, and a second type of signal is a data (Data) signal. The SA signal is used to indicate a resource used by the data signal and a time adjustment amount obtained when the data signal is received.

Generally, when D2D communication is performed between two UEs, a transmit end first sends an SA signal to a receive end, so as to indicate, to the receive end, a time adjustment amount and a subframe that is used by the transmit end for sending a data signal. The receive end determines, according to the time adjustment amount and the subframe that are indicated in the SA signal, an initial time point of receiving the data signal, where the subframe is used by the transmit end for sending the data signal; and starts to receive, from the determined initial time point, the data signal sent by the transmit end.

However, in this method for transmitting a data signal, if multiple UEs send data signals in a same subframe, interference is easily caused between the data signals sent by the multiple UEs, and as a result, an accuracy rate of receiving a data signal by a receive end is affected.

SUMMARY

Embodiments of the present invention provide a method for transmitting a data signal and a user equipment, which can reduce interference between signals when multiple user equipments send data signals in a same subframe, thereby improving an accuracy rate of receiving a data signal by a user equipment.

To solve the foregoing technical problem, the embodiments of the present invention disclose the following technical solutions:

According to a first aspect, an embodiment of the present invention provides a method for transmitting a data signal, where the method includes:

acquiring, by a first user equipment, a scheduling assignment signal sent by a second user equipment and a scheduling assignment signal sent by at least one third user equipment, where the second user equipment is a user equipment that performs device-to-device communication with the first user equipment;

determining, by the first user equipment, a first time adjustment amount according to a time adjustment amount included in the acquired scheduling assignment signal, where the first time adjustment amount is not less than the time adjustment amount included in the scheduling assignment signal sent by the second user equipment; and receiving, by the first user equipment according to the first time adjustment amount and subframe information that is included in the scheduling assignment signal sent by the second user equipment, a data signal sent by the second user equipment.

With reference to the first aspect, in a first possible implementation manner of the first aspect, the determining, by the first user equipment, a first time adjustment amount according to a time adjustment amount included in the acquired scheduling assignment signal includes:

determining, by the first user equipment, the first time adjustment amount according to a maximum value of the time adjustment amount included in the acquired scheduling assignment signal, where the first time adjustment amount is not less than the maximum value.

With reference to the first aspect, in a second possible implementation manner of the first aspect, the determining, by the first user equipment, a first time adjustment amount according to a time adjustment amount included in the acquired scheduling assignment signal includes:

reading, by the first user equipment, the subframe information from the scheduling assignment signal sent by the second user equipment, where the subframe information indicates N subframes used by the second user equipment for sending the data signal, and N is an integer not less than 1; and determining, by the first user equipment, the first time adjustment amount of a subframe i according to the time adjustment amount included in the scheduling assignment signal sent by the second user equipment and a maximum value of a time adjustment amount included in at least one first scheduling assignment signal, where the first time adjustment amount is not less than the maximum value, the first scheduling assignment signal is the scheduling assignment signal sent by the third user equipment, and a subframe indicated by subframe information included in the first scheduling assignment signal includes the subframe i, where a value of i is one or more integers in integers 1 to N.

According to a second aspect, an embodiment of the present invention provides a user equipment, where the user equipment includes:

an acquiring unit, configured to acquire a scheduling assignment signal sent by a second user equipment and a scheduling assignment signal sent by at least one third user equipment, where the second user equipment is a user equipment that performs device-to-device communication with a first user equipment;

a determining unit, configured to determine a first time adjustment amount according to a time adjustment amount included in the scheduling assignment signal acquired by the acquiring unit, where the first time adjustment amount is not less than the time adjustment amount included in the scheduling assignment signal sent by the second user equipment; and a receiving unit, configured to receive, according to the first time adjustment amount determined by the determining unit and subframe information included in the scheduling assignment signal that is sent by the second user equipment and acquired by the acquiring unit, a data signal sent by the second user equipment.

With reference to the second aspect, in a first possible implementation manner of the second aspect, the determining unit is specifically configured to:

determine the first time adjustment amount according to a maximum value of the time adjustment amount included in the acquired scheduling assignment signal, where the first time adjustment amount is not less than the maximum value.

With reference to the second aspect, in a second possible implementation manner of the second aspect, the determining unit includes:

a reading subunit, configured to read the subframe information from the scheduling assignment signal sent by the second user equipment, where the subframe information indicates N subframes used by the second user equipment for sending the data signal, and N is an integer not less than 1; and a processing subunit, configured to determine the first time adjustment amount of a subframe i according to the time adjustment amount included in the scheduling assignment signal sent by the second user equipment and a maximum value of a time adjustment amount included in at least one first scheduling assignment signal, where the first time adjustment amount is not less than the maximum value, the first scheduling assignment signal is the scheduling assignment signal sent by the third user equipment, and a subframe indicated by subframe information included in the first scheduling assignment signal includes the subframe i, where a value of i is one or more integers in integers 1 to N.

According to a third aspect, a user equipment is provided, where the user equipment includes:

a transceiver, configured to acquire a scheduling assignment signal sent by a second user equipment and a scheduling assignment signal sent by at least one third user equipment, where the second user equipment is a user equipment that performs device-to-device communication with a first user equipment; and a processor, configured to determine a first time adjustment amount according to a time adjustment amount included in the scheduling assignment signal acquired by the transceiver, where the first time adjustment amount is not less than the time adjustment amount included in the scheduling assignment signal sent by the second user equipment; where the transceiver is further configured to receive, according to the first time adjustment amount determined by the processor and subframe information included in the scheduling assignment signal sent by the second user equipment, a data signal sent by the second user equipment.

With reference to the third aspect, in a first possible implementation manner of the first aspect, the processor is specifically configured to determine the first time adjustment amount according to a maximum value of the time adjustment amount included in the scheduling assignment signal acquired by the transceiver, where the first time adjustment amount is not less than the maximum value.

With reference to the third aspect, in a second possible implementation manner of the third aspect, the processor is specifically configured to read the subframe information from the scheduling assignment signal sent by the second user equipment, where the subframe information indicates N subframes used by the second user equipment for sending the data signal, and N is an integer not less than 1; and determine the first time adjustment amount of a subframe i according to the time adjustment amount included in the scheduling assignment signal sent by the second user equipment and a maximum value of a time adjustment amount included in at least one first scheduling assignment signal, where the first time adjustment amount is not less than the maximum value, the first scheduling assignment signal is the scheduling assignment signal sent by the third user equipment, and a subframe indicated by subframe information included in the first scheduling assignment signal includes the subframe i, where a value of i is one or more integers in integers 1 to N.

In the embodiments of the present invention, when acquiring an SA signal, a first UE acquires not only an SA signal sent by a second UE that performs D2D communication with the first UE, but also acquires an SA signal sent by at least one third UE. A data signal sent by the second UE is no longer received only according to a time adjustment amount included in the SA signal sent by the second UE. Instead, a first time adjustment amount is determined according to a time adjustment amount included in all acquired SA signals, where the first time adjustment amount is not less than the time adjustment amount included in the SA signal sent by the second UE, and then the data signal sent by the second UE is received according to the first time adjustment amount. The first UE increases the time adjustment amount included in the SA signal sent by the second UE; therefore, if a case in which another UE and the second UE send data signals in a same subframe exists, interference of a data signal sent by a UE whose time adjustment amount is relatively large with receiving of a data signal sent by the second UE can be reduced and even avoided, and a transmission effect of the data signal sent by the second UE and an accuracy rate of receiving, by the first UE, the data signal sent by the second UE are improved.

BRIEF DESCRIPTION OF THE DRAWINGS

To describe the technical solutions in the embodiments of the present invention more clearly, the following briefly introduces the accompanying drawings required for describing the embodiments. Apparently, a person of ordinary skill in the art may still derive other drawings from these accompanying drawings without creative efforts.

DETAILED DESCRIPTION OF ILLUSTRATIVE EMBODIMENTS

Figure 1A:
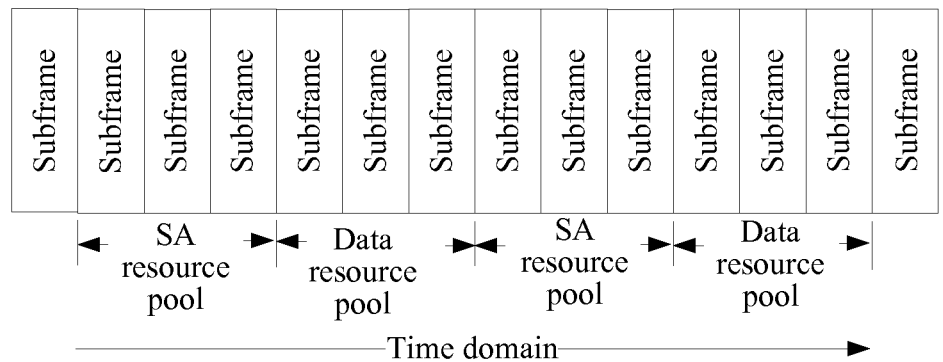
FIG. 1A is an exemplary diagram of a subframe division method.
Figure 1B:
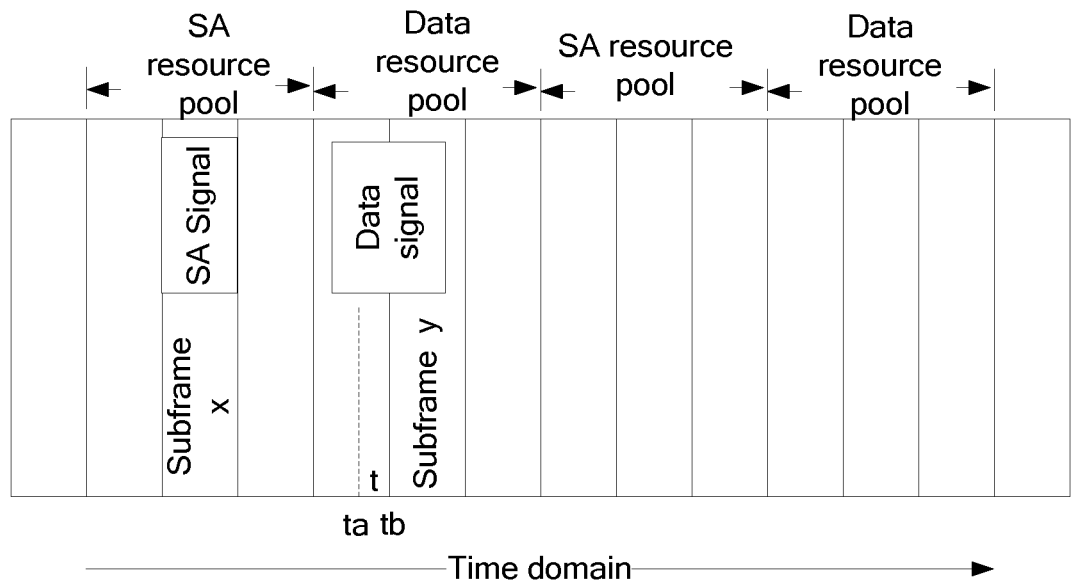
FIG. 1B is an exemplary diagram of performing D2D communication between two UEs.
Figure 1C:
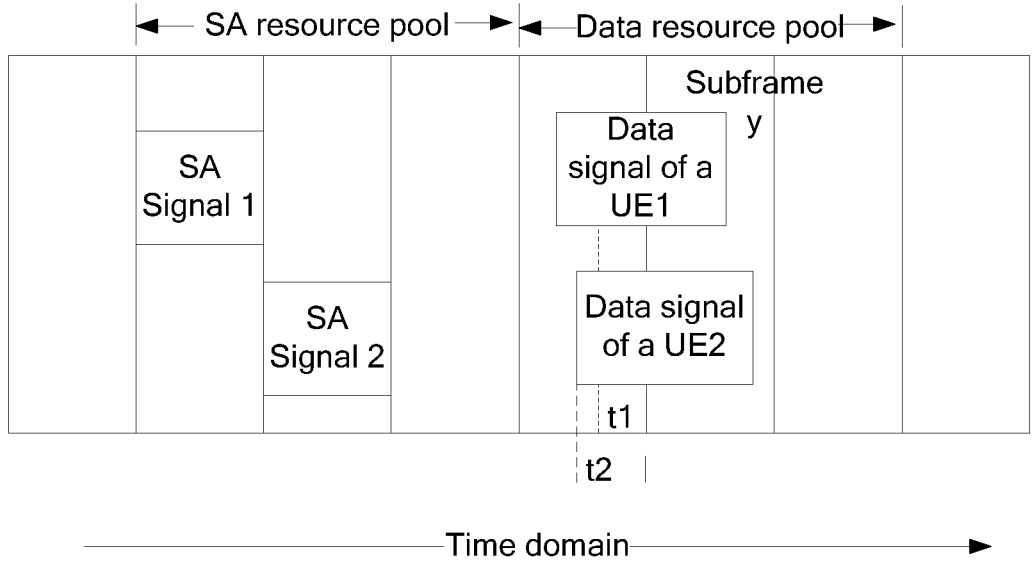
FIG. 1C is a schematic diagram of a principle of data signal interference between multiple UEs.

As shown in FIG. 1A, currently, a subframe is generally classified into an SA resource pool and a data resource pool, where the SA resource pool and the data resource pool alternately distributed, and the number of subframes included in each SA resource pool and the number of subframes included in each data resource pool are not limited. Generally, subframe classification is performed by a network side (for example, a base station), and a classification result is sent to each UE. In FIG. 1A to FIG. 1C, that the SA resource pool and the data resource pool each include three subframes is used as example; however, FIG. 1A to FIG. 1C are merely exemplary, but are not intended to limit the number of subframes included in the SA resource pool and the number of subframes included in the data resource pool. A transmit end sends an SA signal to a receive end by using a subframe in the SA resource pool, and the transmit end sends a data signal to the receive end by using a subframe in the data resource pool.

For example, as shown in FIG. 1B, the transmit end sends an SA signal in a subframe (a subframe x shown in FIG. 1B) in the SA resource pool, and indicates, to the receive end by using the SA signal, a time adjustment amount t and a subframe (a subframe y shown in FIG. 1B) that is used by the transmit end for sending a data signal. The subframe used by the transmit end for sending the data signal should be located in the data resource pool, and the transmit end sends the data signal in a corresponding subframe in the data resource pool. Correspondingly, the receive end receives the SA signal; determines, according to the time adjustment amount and the subframe that are indicated in the SA signal, an initial time point of receiving the data signal sent by the transmit end, where the subframe is used by the transmit end for sending the data signal; and starts to receive, from the determined initial time point, the data signal sent by the transmit end. As shown in FIG. 1B, a time difference between an initial time point to and a reference time point tb of the subframe y is the time adjustment amount t.

However, as shown in FIG. 1C, if there are two pairs of UEs, that is a UE1 and a UE3, and a UE2 and a UE4, that perform D2D communication, it is assumed that the transmit end is the UE1 and the UE2, the UE1 sends an SA signal 1 to the UE3 and indicates, to the UE3, a time adjustment amount t1 and a subframe that is used by the UE1 for sending a data signal, and the UE2 sends an SA signal 2 to the UE4 and indicates, to the UE4, a time adjustment amount t2 and a subframe that is used by the UE2 for sending a data signal; and it is assumed that the subframes used by the UE1 and the UE2 for sending the data signals are the same, the data signals are separately sent in a manner such as frequency division multiplexing, and t2>t1; then, when the UE3 receives, according to the time adjustment amount t1 and in a corresponding subframe, the data signal sent by the UE1, because the time adjustment amount t2 of the UE2 is greater than the time adjustment amount t1 of the UE1, the data signal sent by the UE2 cannot completely fall into a receive window of the UE3, as shown in FIG. 1C, a part between t2 and t1 is a part that does not fall into the receive window of the UE3, and then the data signal sent by the UE2 generates inter-carrier interference with receiving, by the UE3, the data signal sent by the UE1, thereby reducing an accuracy rate of receiving, by the UE3, the data signal sent by the UE1.

Based on an example shown in FIG. 1C and an extension of the example to a scenario in which multiple UEs send data signals in a same subframe, it may be learned that, currently, when multiple UEs send data signals in a same subframe, a data signal sent by a UE whose time adjustment amount is relatively large interferes with receiving of a data signal sent by a UE whose time adjustment amount is relatively small, and as a result, a transmission effect and receiving accuracy rate of the data signal sent by the UE whose time adjustment amount is relatively small are affected.

In order to solve the problem, embodiments of the present invention provide a method for transmitting a data signal and a user equipment, so that in a case in which multiple UEs send data signals in a same subframe, interference of a data signal sent by a UE whose time adjustment amount is relatively large with receiving of a data signal sent by a UE whose time adjustment amount is relatively small can be reduced and even avoided, and a transmission effect and receiving accuracy rate of the data signal sent by the UE whose time adjustment amount is relatively small are improved.

To enable a person skilled in the art to understand the technical solutions in the embodiments of the present invention better, and make the foregoing objectives, features, and advantages of the embodiments of the present invention clearer, the following describes the technical solutions in the embodiments of the present invention in further detail with reference to the accompanying drawings.

Figure 2:
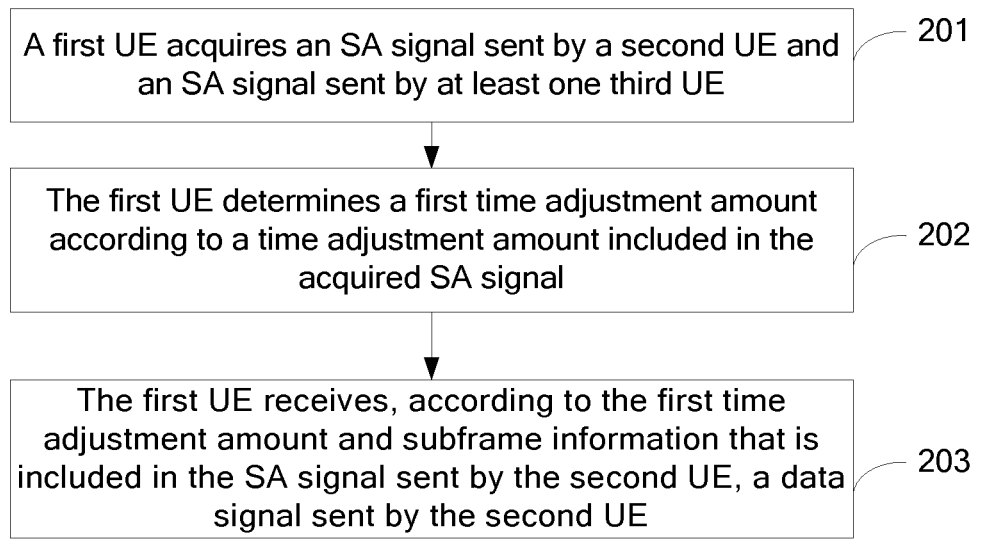
FIG. 2 is a schematic diagram of an embodiment of a method for transmitting a data signal according to the present invention.

FIG. 2 is a flowchart of an embodiment of a method for transmitting a data signal according to the present invention, where this embodiment is described from a receive end side (a first UE) that performs D2D communication.

Step 201: The first UE acquires an SA signal sent by a second UE and an SA signal sent by at least one third UE, where the second UE is a UE that performs D2D communication with the first UE.

When the first UE performs D2D communication with the second UE, the first UE is a receive end and the second UE is a transmit end.

The third UE represents another UE except the first UE and the second UE. In this step, the first UE acquires, from an SA resource pool, not only an SA signal sent by the second UE that performs D2D communication with the first UE, but also an SA signal sent by at least one third UE except the first UE and the second UE. This embodiment focuses on how the first UE receives a data signal sent by the second UE; and the third UE may be a UE that performs D2D communication with the first UE, or may be a UE that does not perform D2D communication with the first UE, which is not limited herein.

The SA signal sent by the third UE is an SA signal that can be received by the first UE, for example, the third UE sends the SA signal in a broadcast manner, and the SA signal sent by the third UE can be received by any UE (including the first UE).

Generally, the first UE in this step may attempt to acquire, from the SA resource pool, all SA signals that the first UE can acquire.

Step 202: The first UE determines a first time adjustment amount according to a time adjustment amount included in the acquired SA signal, where the first time adjustment amount is not less than the time adjustment amount included in the SA signal sent by the second UE.

Step 203: The first UE receives, according to the first time adjustment amount and subframe information that is included in the SA signal sent by the second UE, a data signal sent by the second UE.

Figure 3:
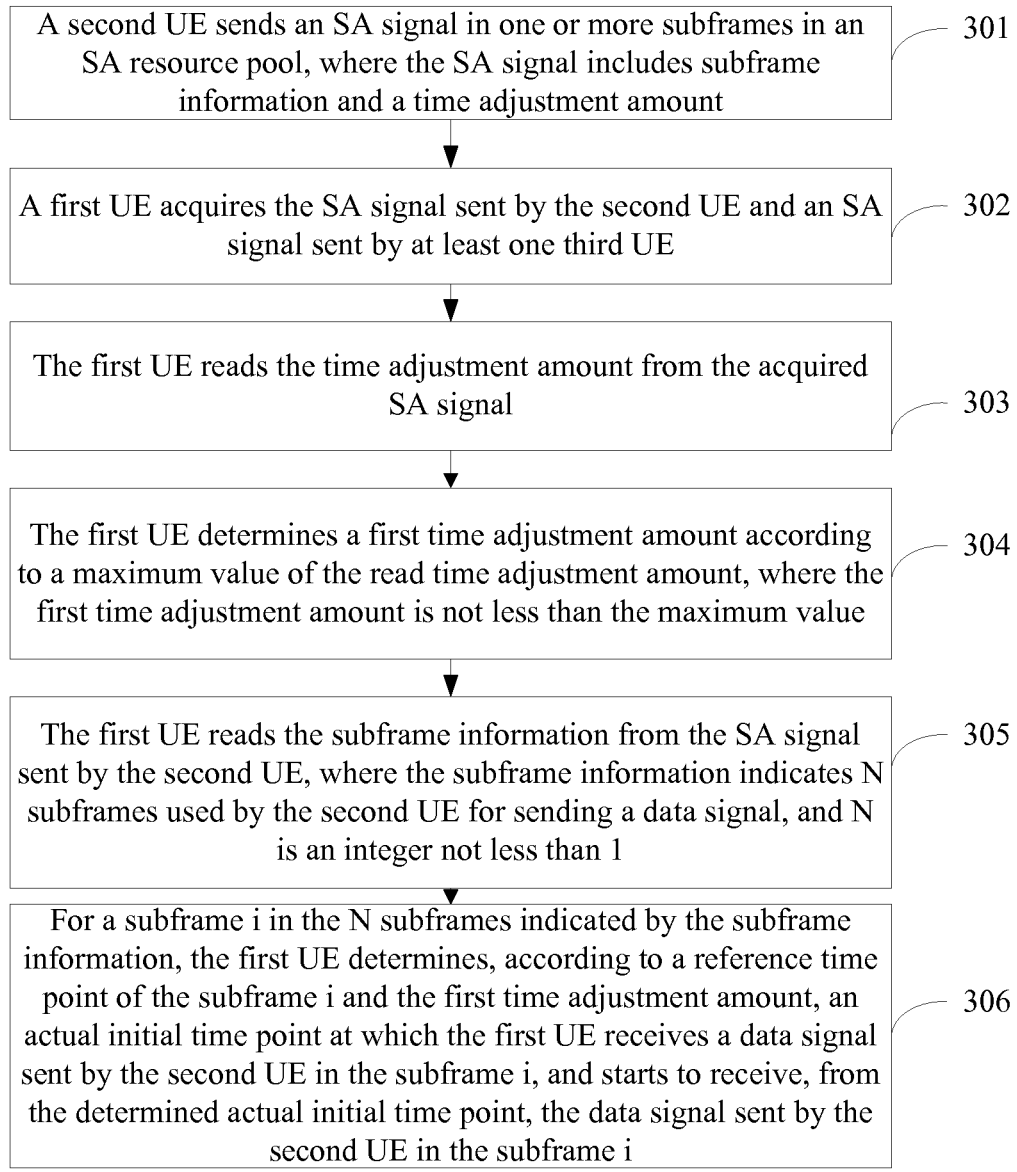
FIG. 3 is a schematic diagram of another embodiment of a method for transmitting a data signal according to the present invention.
Figure 4:
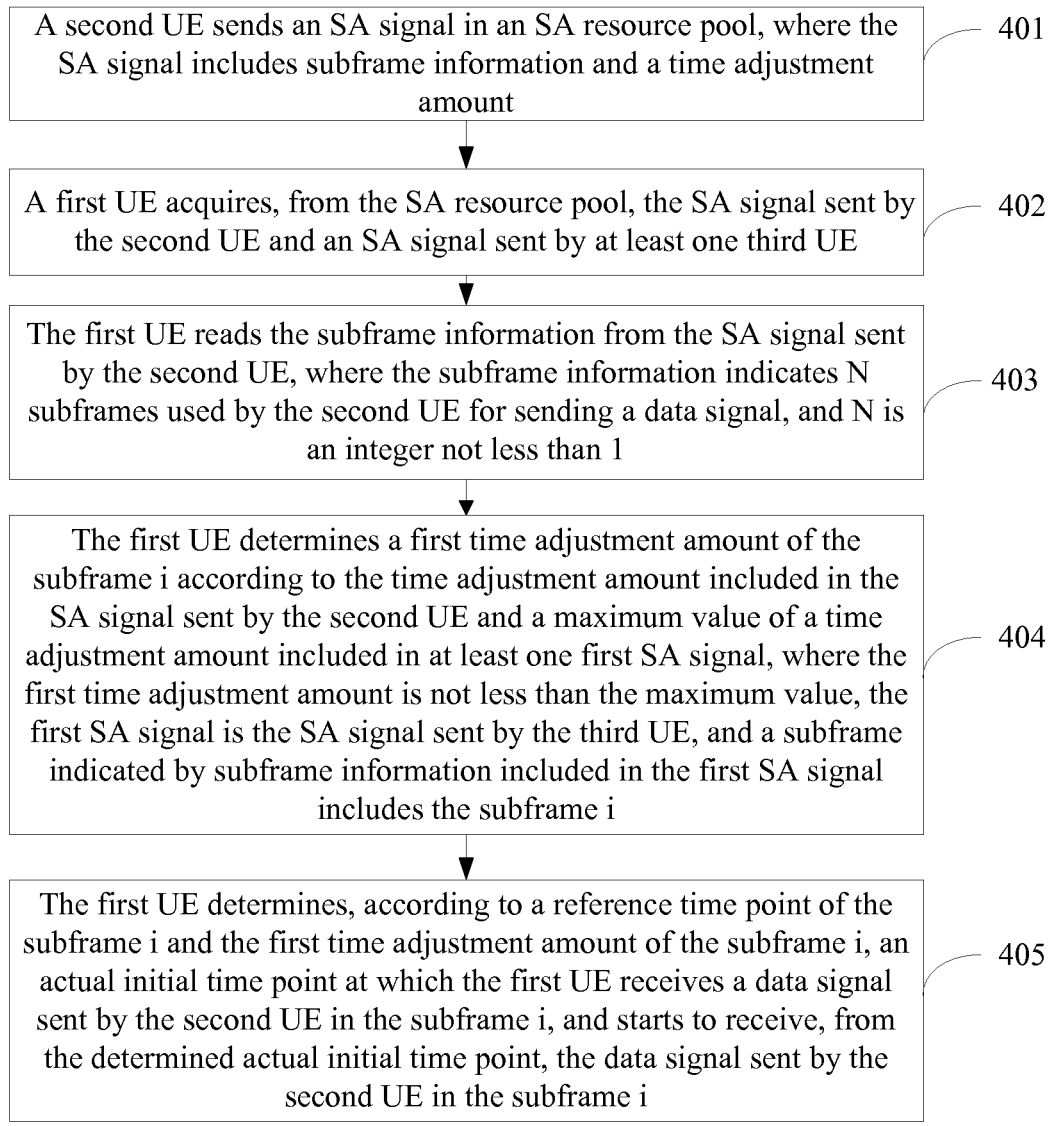
FIG. 4 is a schematic diagram of another embodiment of a method for transmitting a data signal according to the present invention.

Possible implementation manners of step 202 and step 203 are separately described, by using an example, in embodiments shown in FIG. 3 and FIG. 4, and details are not described herein again.

The subframe information included in the SA signal sent by the second UE is used to indicate N subframes used by the second UE for sending the data signal, where N is an integer not less than 1. How the subframe information indicates a subframe is not limited in the present invention, for example, the subframe information may indicate the subframe by using an identifier of the subframe.

In this embodiment, when acquiring an SA signal, a first UE acquires not only an SA signal sent by a second UE that performs D2D communication with the first UE, but also acquires an SA signal sent by at least one third UE. A data signal sent by the second UE is no longer received only according to a time adjustment amount included in the SA signal sent by the second UE. Instead, a first time adjustment amount is determined according to a time adjustment amount included in all acquired SA signals, where the first time adjustment amount is not less than the time adjustment amount included in the SA signal sent by the second UE, and then the data signal sent by the second UE is received according to the first time adjustment amount. The first UE increases the time adjustment amount included in the SA signal sent by the second UE; therefore, if a case in which another UE and the second UE send data signals in a same subframe exists, interference of a data signal sent by a UE whose time adjustment amount is relatively large with receiving of a data signal sent by the second UE can be reduced and even avoided, and a transmission effect of the data signal sent by the second UE and an accuracy rate of receiving, by the first UE, the data signal sent by the second UE are improved.

FIG. 3 is a flowchart of an embodiment of a method for transmitting a data signal according to the present invention, where this embodiment illustrates a process of data signal transmission performed between a first UE and a second UE that perform D2D communication. In this embodiment, it is assumed that a direct link has been established between the first UE and the second UE and D2D communication can be performed.

Step 301: The second UE sends an SA signal in one or more subframes in an SA resource pool, where the SA signal includes subframe information and a time adjustment amount, and the subframe information is used to indicate a subframe used by the second UE for sending a data signal.

Step 302: The first UE acquires the SA signal sent by the second UE and an SA signal sent by at least one third UE.

In an actual application, in addition to this pair of UEs, that is, the first UE and the second UE, that perform D2D communication, generally, another pair of UEs that perform D2D communication may also exist, and a transmit end of the pair of UEs may also send its own SA signal in a same SA resource pool, where the SA signal indicates a time adjustment amount and a subframe that is used by the transmit end, which sends the SA signal, for sending a data signal.

For example, it is assumed that there are five UEs from a UE1 to a UE5, the UE1 and the UE2 are a pair of UEs that perform D2D communication, the UE3 and the UE2 are a pair of UEs that perform D2D communication, and the UE4 and the UE5 are a pair of UEs that perform D2D communication, where each of the UE1, the UE3, and the UE4 is a transmit end, and each of the UE2 and the UE5 is a receive end. The UE1, the UE3, and the UE4 may separately send an SA signal in a same subframe or different subframes of a same SA resource pool. For example, it is assumed that there are three subframes in an SA resource pool, the UE1 may send an SA signal 1 in a first subframe of the SA resource pool, the UE3 may send an SA signal 2 in a second subframe of the SA resource pool, and the UE4 may send an SA signal 3 in a third subframe of the SA resource pool.

If the UE1 is the second UE and the UE2 is the first UE, then in step 302, the UE2 acquires both the SA signal 1 sent by the UE1 and the SA signal 2 sent by the UE3, and in a case in which a receiving condition permits, the UE2 may further acquire the SA signal 3 sent by the UE4, where the UE3 and the UE4 are the third UEs mentioned in this specification.

Step 303: The first UE reads the time adjustment amount from the acquired SA signal.

Referring to the example in step 302, the UE2 acquires the SA signal 1, the SA signal 2 and the SA signal 3; and then in this step, the UE2 reads a time adjustment amount from the SA signal 1, where it is assumed that the time adjustment amount is t1, reads a time adjustment amount from the SA signal 2, where it is assumed that the time adjustment amount is t2, and reads a time adjustment amount from the SA signal 3, where it is assumed that the time adjustment amount is t3.

Step 304: The first UE determines a first time adjustment amount according to a maximum value of the read time adjustment amount, where the first time adjustment amount is not less than the maximum value.

Referring to the example in step 303, it is assumed that the time adjustment amount t3>t2>t1, and then the UE2 determines the first time adjustment amount according to the time adjustment amount t3. Specifically, the first time adjustment amount may be determined as t3, or the first time adjustment amount may be determined as any value that is greater than t3. In a possible implementation manner, the first time adjustment amount may be determined as the maximum value t3 plus a preset time adjustment amount t0, where a value of the preset time adjustment amount t0 may be based on a non-ideal factor of UE implementation, for example, a timing offset. Under a condition that the first time adjustment amount is not less than t3, a smaller value of the determined first time adjustment amount indicates more receiving resources of the first UE that are saved.

Step 305: The first UE reads the subframe information from the SA signal sent by the second UE, where the subframe information indicates N subframes used by the second UE for sending the data signal, and N is an integer not less than 1.

An execution sequence of this step and step 303 and step 304 is not limited.

A specific value of the number N of subframes that is indicated by the subframe information is not limited in the present invention.

Step 306: For a subframe i in the N subframes indicated by the subframe information, the first UE determines, according to a reference time point of the subframe i and the first time adjustment amount, an actual initial time point at which the first UE receives a data signal sent by the second UE in the subframe i, and starts to receive, from the determined actual initial time point, the data signal sent by the second UE in the subframe i.

A value of i is an integer from 1 to N, that is, in this step, the first UE needs to determine an actual initial time point corresponding to each subframe indicated by the subframe information. For example, it is assumed that the subframe information indicates the first to the third subframes and the fifth subframe in a data resource pool; then for the first subframe, the first UE determines an actual initial time point according to a reference time point of the first subframe and the first time adjustment amount, and starts to receive, from the determined actual initial time point, a data signal sent by the second UE in the first subframe; for the second subframe, the first UE determines an actual initial time point according to a reference time point of the second subframe and the first time adjustment amount, and starts to receive, the determined actual initial time point, a data signal sent by the second UE in the second subframe; and then by analogy, actual initial time points of receiving data signals in the third and the fifth subframes are separately determined, so as to implement that a data signal is accurately received in each subframe.

Generally, a network side (for example, a base station) may send the time information such as the reference time point of each subframe to each UE before this step is executed, so that the time information such as the reference time point of each subframe keeps consistent between the base station and each UE.

In this embodiment, a first UE reads a time adjustment amount from each acquired SA signal, and determines a first time adjustment amount according to a maximum value of the read time adjustment amount, where the first time adjustment amount is not less than the maximum value. In this way, if a case in which another UE and a second UE send data signals in a same subframe exists, interference of a data signal sent by a UE whose time adjustment amount is relatively large with receiving of a data signal sent by the second UE can be reduced and even avoided, and a transmission effect of the data signal sent by the second UE and an accuracy rate of receiving, by the first UE, the data signal sent by the second UE are improved.

FIG. 4 is a flowchart of another embodiment of a method for transmitting a data signal according to the present invention, where this embodiment illustrates a process of data signal transmission performed between a first UE and a second UE that perform D2D communication. In this embodiment, it is assumed that a direct link has been established between the first UE and the second UE and D2D communication can be performed.

Step 401 to step 402 are the same as step 301 to step 302, and details are not described herein again.

Step 403: The first UE reads the subframe information from the SA signal sent by the second UE, where the subframe information indicates N subframes used by the second UE for sending a data signal, and N is an integer not less than 1.

Step 404: For a subframe i in the N subframes indicated by the subframe information, the first UE determines a first time adjustment amount of the subframe i according to the time adjustment amount included in the SA signal sent by the second UE and a maximum value of a time adjustment amount included in at least one first SA signal, where the first time adjustment amount is not less than the maximum value, the first SA signal is the SA signal sent by the third UE, and a subframe indicated by subframe information included in the first SA signal includes the subframe i.

A value of i is one or more integers in integers 1 to N, for example, N is equal to 3 (including a subframe 1, a subframe 2 and a subframe 3). It is assumed that subframes indicated by the subframe information included in the first SA signal include the subframe 1 and the subframe 2, and then the first UE determines the first time adjustment amount of the subframe i according to the time adjustment amount included in the SA signal sent by the second UE and the maximum value of the time adjustment amount included in the at least one first SA signal, and in this case, a value of i is 1 and 2.

In a possible implementation manner, that the first UE determines the first time adjustment amount of the subframe i according to the time adjustment amount included in the SA signal sent by the second UE and the maximum value of the time adjustment amount included in the at least one first SA signal may include that:

the first UE selects at least one first SA signal from the acquired SA signal sent by the at least one third UE, where the first SA signal is an SA signal that includes the subframe information, where the subframe information indicates a subframe including the subframe i; and the first UE reads a time adjustment amount from the SA signal sent by the second UE and a time adjustment amount from the selected first SA signal, and determines the first time adjustment amount of the subframe i according to a maximum value of the read time adjustment amounts, where the first time adjustment amount is not less than the maximum value.

An example is used to describe implementation of selection processing in this step. It is assumed that the subframe information read in step 403 includes a subframe x and a subframe (x+1) in a data resource pool. For the subframe x, if SA signals that are acquired by the first UE and sent by the at least one third UE are an SA signal 1 to an SA signal 5, where subframe information of the SA signal 1 to the SA signal 3 includes the subframe x, then the SA signal 1 to the SA signal 3 are the first SA signals, and one or more first SA signals may be selected from the SA signal 1 to the SA signal 3, where the specific number of selected SA signals is not limited in the present invention. However, theoretically, more first SA signals selected from the SA signal 1 to the SA signal 3 indicate a better effect of reducing the problem of interference in the embodiments of the present invention. Similarly, for the subframe (x+1), if SA signals that are acquired by the first UE and sent by the at least one third UE are an SA signal 1 to an SA signal 5, where subframe information of the SA signal 2 to the SA signal 5 includes the subframe (x+1), then the SA signal 2 to the SA signal 5 are the first SA signals, and one or more first SA signals may be selected from the SA signal 2 to the SA signal 5, where the specific number of selected SA signals is not limited in the present invention.

In this step, reference may be made to step 303 and step 304 for implementation of reading a time adjustment amount and determining the first time adjustment amount. A difference lies only in that, in this step, the time adjustment amount is read only from the SA signal sent by the second UE and the selected first SA signal, and a correspondence exists between the first time adjustment amount determined in this step and a subframe indicated by the subframe information.

Step 405: The first UE determines, according to a reference time point of the subframe i and the first time adjustment amount of the subframe i, an actual initial time point at which the first UE receives a data signal sent by the second UE in the subframe i, and starts to receive, from the determined actual initial time point, the data signal sent by the second UE in the subframe i.

Implementation of this step is similar to that of step 306. A difference lies only in that in step 405, each subframe indicated in the subframe information corresponds to a first time adjustment amount, while in step 306, each subframe indicated by the subframe information corresponds to a same first time adjustment amount, and details are not described herein again.

In this embodiment, a first UE determines a first time adjustment amount of a subframe i according to a time adjustment amount included in an SA signal sent by a second UE and a maximum value of a time adjustment amount included in at least one first SA signal, where the first time adjustment amount is not less than the maximum value. The first UE determines, according to a reference time point of the subframe i and the first time adjustment amount of the subframe i, an actual initial time point at which the first UE receives a data signal sent by the second UE in the subframe i, and starts to receive, from the determined actual initial time point, the data signal sent by the second UE in the subframe i. For each subframe for sending the data signal by the second UE, the first UE determines a first time adjustment amount of the subframe according to a time adjustment amount of the second UE and a time adjustment amount of at least one third UE that sends a data signal in the subframe, where the first time adjustment amount is not less than a maximum value thereof. In this way, in a case that the second UE and another UE send data signals in a same subframe, interference of a data signal sent by a UE whose time adjustment amount is relatively large with receiving of a data signal sent by the second UE can be reduced and even avoided, and a transmission effect of the data signal sent by the second UE and an accuracy rate of receiving, by the first UE, the data signal sent by the second UE are improved.

Corresponding to the embodiment of the method for transmitting a data signal according to the present invention, the present invention further provides an embodiment of a UE. The UE may be used as a receive end or may be used as a transmit end.

Figure 5:
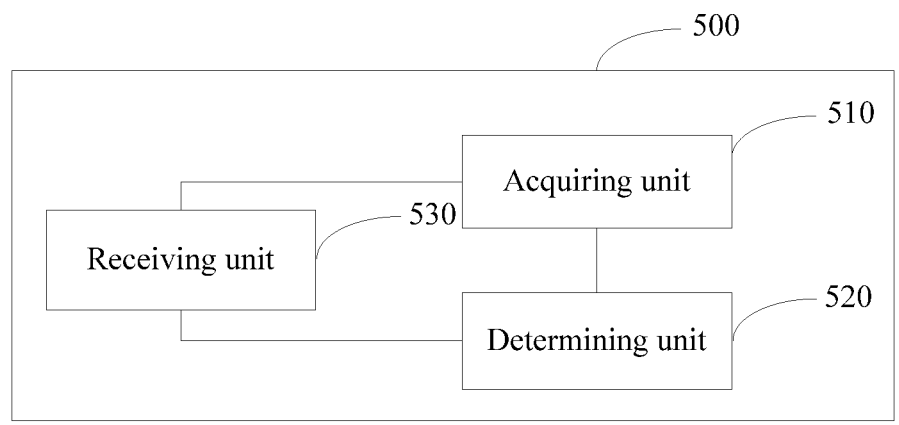
FIG. 5 is a schematic diagram of an embodiment of a UE according to the present invention.

FIG. 5 is a block diagram of an embodiment of a UE 500 according to the present invention, where the UE 500 includes: an acquiring unit 510, a determining unit 520, and a receiving unit 530, where the acquiring unit 510 is configured to acquire an SA signal sent by a second UE and an SA signal sent by at least one third UE, where the second UE is a UE that performs D2D communication with a first UE;

the determining unit 520 is configured to determine a first time adjustment amount according to a time adjustment amount included in the SA signal acquired by the acquiring unit 510, where the first time adjustment amount is not less than the time adjustment amount included in the SA signal sent by the second UE; and the receiving unit 530 is configured to receive, according to the first time adjustment amount determined by the determining unit 520 and subframe information included in the SA signal that is sent by the second UE and acquired by the acquiring unit 510, a data signal sent by the second UE.

Optionally, the determining unit 520 may be specifically configured to determine the first time adjustment amount according to a maximum value of the time adjustment amount included in the acquired SA signal, where the first time adjustment amount is not less than the maximum value.

Optionally, the determining unit 520 may include:

a reading subunit, configured to read the subframe information from the SA signal sent by the second UE, where the subframe information indicates N subframes used by the second UE for sending the data signal, and N is an integer not less than 1; and a processing subunit, configured to determine the first time adjustment amount of a subframe i according to the time adjustment amount included in the SA signal sent by the second UE and a maximum value of a time adjustment amount included in at least one first SA signal, where the first time adjustment amount is not less than the maximum value, the first SA signal is the SA signal sent by the third UE, and a subframe indicated by subframe information included in the first SA signal includes the subframe i, where a value of i is one or more integers in integers 1 to N.

In this embodiment, when acquiring an SA signal, a first UE acquires not only an SA signal sent by a second UE that performs D2D communication with the first UE, but also acquires an SA signal sent by at least one third UE. A data signal sent by the second UE is no longer received only according to a time adjustment amount included in the SA signal sent by the second UE. Instead, a first time adjustment amount is determined according to a time adjustment amount included in all acquired SA signals, where the first time adjustment amount is not less than the time adjustment amount included in the SA signal sent by the second UE, and then the data signal sent by the second UE is received according to the first time adjustment amount. The first UE increases the time adjustment amount included in the SA signal sent by the second UE; therefore, if a case in which another UE and the second UE send data signals in a same subframe exists, interference of a data signal sent by a UE whose time adjustment amount is relatively large with receiving of a data signal sent by the second UE can be reduced and even avoided, and a transmission effect of the data signal sent by the second UE and an accuracy rate of receiving, by the first UE, the data signal sent by the second UE are improved.

Figure 6:
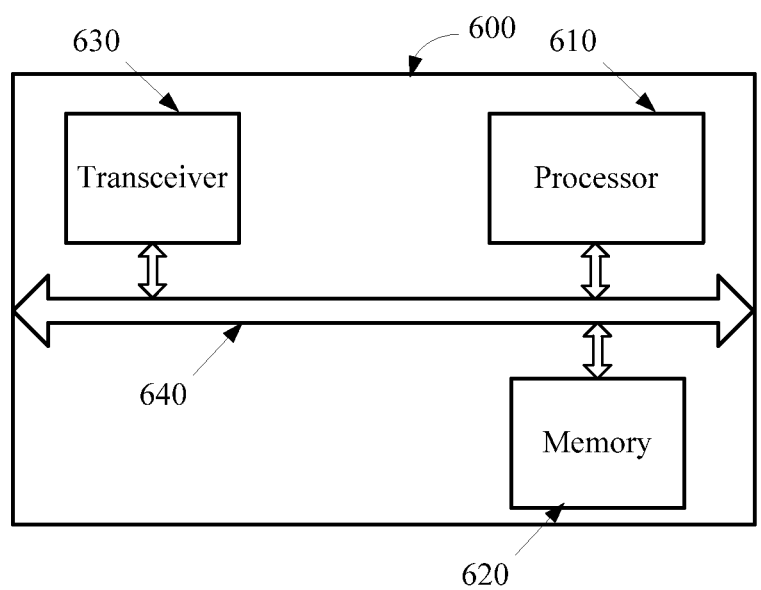
FIG. 6 is a schematic diagram of another embodiment of a UE according to the present invention.

FIG. 6 is a schematic structural diagram of a UE 600 according to an embodiment of the present invention, where the UE may be used as a receive end, and the UE 600 includes a processor 610, a memory 620, a transceiver 630, and a bus 640.

The processor 610, the memory 620, and the transceiver 630 are connected by using the bus 640, and the bus 640 may be an ISA bus, a PCI bus, an EISA bus, or the like. The bus may be classified into an address bus, a data bus, a control bus, and the like. For ease of indication, the bus is indicated by using only one bold line in FIG. 6; however, it does not indicate that there is only one bus or only one type of bus.

The memory 620 is configured to store a program. Specifically, the program may include program code, where the program code includes a computer operation instruction. The memory 620 may include a high-speed RAM memory, or may include a non-volatile memory (non-volatile memory), such as at least one disk memory.

The transceiver 630 is configured to connect to another device and communicate with the another device. The transceiver 630 is configured to acquire an SA signal sent by a second UE and an SA signal sent by at least one third UE, where the second UE is a UE that performs D2D communication with a first UE; and receive, according to a first time adjustment amount determined by the processor 610 and subframe information included in the SA signal sent by the second UE, a data signal sent by the second UE.

The processor 610 executes the program code and is configured to determine the first time adjustment amount according to a time adjustment amount included in the SA signal acquired by the transceiver 630, where the first time adjustment amount is not less than the time adjustment amount included in the SA signal sent by the second UE.

Optionally, the processor 610 may be specifically configured to determine the first time adjustment amount according to a maximum value of the time adjustment amount included in the SA signal acquired by the transceiver 630, where the first time adjustment amount is not less than the maximum value.

Optionally, the processor 620 may be specifically configured to read the subframe information from the SA signal sent by the second UE, where the subframe information indicates N subframes used by the second UE for sending the data signal, and N is an integer not less than 1; and determine the first time adjustment amount of a subframe i according to the time adjustment amount included in the SA signal sent by the second UE and a maximum value of a time adjustment amount included in at least one first SA signal, where the first time adjustment amount is not less than the maximum value, the first SA signal is the SA signal sent by the third UE, and a subframe indicated by subframe information included in the first SA signal includes the subframe i, where a value of i is one or more integers in integers 1 to N.

In this embodiment, when acquiring an SA signal, a first UE acquires not only an SA signal sent by a second UE that performs D2D communication with the first UE, but also acquires an SA signal sent by at least one third UE. A data signal sent by the second UE is no longer received only according to a time adjustment amount included in the SA signal sent by the second UE. Instead, a first time adjustment amount is determined according to a time adjustment amount included in all acquired SA signals, where the first time adjustment amount is not less than the time adjustment amount included in the SA signal sent by the second UE, and then the data signal sent by the second UE is received according to the first time adjustment amount. The first UE increases the time adjustment amount included in the SA signal sent by the second UE; therefore, if a case in which another UE and the second UE send data signals in a same subframe exists, interference of a data signal sent by a UE whose time adjustment amount is relatively large with receiving of a data signal sent by the second UE can be reduced and even avoided, and a transmission effect of the data signal sent by the second UE and an accuracy rate of receiving, by the first UE, the data signal sent by the second UE are improved.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; and for relevant parts, reference may be made to partial descriptions in the method embodiment.

The foregoing descriptions are implementation manners of the present invention, but are not intended to limit the protection scope of the present invention. Any modification, equivalent replacement, and improvement made without departing from the principle of the present invention shall fall within the protection scope of the present invention.

What is claimed is:

1. A method for transmitting a data signal, comprising:
   acquiring, by a first user equipment, a scheduling assignment signal sent by a second user equipment and a scheduling assignment signal sent by at least one third user equipment, wherein the second user equipment is a user equipment that performs device-to-device communication with the first user equipment;
   determining, by the first user equipment, a first time adjustment amount according to a time adjustment amount of the acquired scheduling assignment signal, wherein the first time adjustment amount is not less than the time adjustment amount of the scheduling assignment signal sent by the second user equipment; and
   receiving, by the first user equipment and according to the first time adjustment amount and further according to subframe information that is of the scheduling assignment signal sent by the second user equipment, a data signal sent by the second user equipment.

2. The method according to claim 1, wherein the determining, by the first user equipment, the first time adjustment amount according to the time adjustment amount of the acquired scheduling assignment signal comprises:
   determining, by the first user equipment, the first time adjustment amount according to a maximum value of the time adjustment amount of the acquired scheduling assignment signal, wherein the first time adjustment amount is not less than the maximum value.

3. The method according to claim 1, wherein the determining, by the first user equipment, the first time adjustment amount according to the time adjustment amount of the acquired scheduling assignment signal comprises:
   reading, by the first user equipment, the subframe information from the scheduling assignment signal sent by the second user equipment, wherein the subframe information indicates N subframes used by the second user equipment for sending the data signal, and N is an integer not less than 1; and
   determining, by the first user equipment, the first time adjustment amount of a subframe i according to the time adjustment amount of the scheduling assignment signal sent by the second user equipment and further according to a maximum value of a time adjustment amount of at least one first scheduling assignment signal, wherein the first time adjustment amount is not less than the maximum value, wherein the first scheduling assignment signal is the scheduling assignment signal sent by the third user equipment, and wherein a subframe indicated by subframe information of the first scheduling assignment signal comprises the subframe i, wherein a value of i is one or more integers in integers 1 to N.

4. A user equipment, comprising:
   a processor;
   a non-transitory computer readable medium connected to the processor and having stored thereon instructions that, when executed, cause the processor to:
     acquire a scheduling assignment signal sent by a second user equipment and a scheduling assignment signal sent by at least one third user equipment, wherein the second user equipment is a user equipment that performs device-to-device communication with a first user equipment;

determine a first time adjustment amount according to a time adjustment amount of the scheduling assignment signal, wherein the first time adjustment amount is not less than the time adjustment amount of the scheduling assignment signal sent by the second user equipment; and receive, according to the first time adjustment amount and subframe information of the scheduling assignment signal that is sent by the second user equipment, a data signal sent by the second user equipment.

5. The user equipment according to claim 4, wherein the instructions that, when executed, cause the processor to determine a first time adjustment amount according to a time adjustment amount of the scheduling assignment signal comprise instructions, that when executed, cause the processor to:

determine the first time adjustment amount according to a maximum value of the time adjustment amount of the acquired scheduling assignment signal, wherein the first time adjustment amount is not less than the maximum value.

6. The user equipment according to claim 4, wherein the instructions that, when executed, cause the processor to determine a first time adjustment amount according to a time adjustment amount of the scheduling assignment signal comprise instructions, that when executed, cause the processor to:

read the subframe information from the scheduling assignment signal sent by the second user equipment, wherein the subframe information indicates N subframes used by the second user equipment for sending the data signal, and N is an integer not less than 1; and determine the first time adjustment amount of a subframe i according to the time adjustment amount of the scheduling assignment signal sent by the second user equipment and a maximum value of a time adjustment amount of at least one first scheduling assignment signal, wherein the first time adjustment amount is not less than the maximum value, wherein the first scheduling assignment signal is the scheduling assignment signal sent by the third user equipment, wherein a subframe indicated by subframe information of the first scheduling assignment signal comprises the subframe i, and wherein a value of i is one or more integers in integers 1 to N.

7. A user equipment, comprising:

a transceiver, configured to acquire a scheduling assignment signal sent by a second user equipment and a scheduling assignment signal sent by at least one third user equipment, wherein the second user equipment is a user equipment that performs device-to-device communication with a first user equipment;

a processor connected to the transceiver; and a non-transitory computer readable medium connected to the processor and having stored thereon instructions that, when executed, cause the processor to:

determine a first time adjustment amount according to a time adjustment amount of the scheduling assignment signal acquired by the transceiver, wherein the first time adjustment amount is not less than the time adjustment amount of the scheduling assignment signal sent by the second user equipment;

wherein the transceiver is further configured to receive, according to the first time adjustment amount and subframe information of the scheduling assignment signal sent by the second user equipment, a data signal sent by the second user equipment.

8. The user equipment according to claim 7, wherein the non-transitory computer readable medium connected further has stored thereon instructions that, when executed, cause the processor to determine the first time adjustment amount according to a maximum value of the time adjustment amount of the scheduling assignment signal acquired by the transceiver, wherein the first time adjustment amount is not less than the maximum value.

9. The user equipment according to claim 7, wherein the non-transitory computer readable medium connected further has stored thereon instructions that, when executed, cause the processor to:

read the subframe information from the scheduling assignment signal sent by the second user equipment, wherein the subframe information indicates N subframes used by the second user equipment for sending the data signal, and wherein N is an integer not less than 1; and determine the first time adjustment amount of a subframe i according to the time adjustment amount of the scheduling assignment signal sent by the second user equipment and a maximum value of a time adjustment amount of at least one first scheduling assignment signal, wherein the first time adjustment amount is not less than the maximum value, wherein the first scheduling assignment signal is the scheduling assignment signal sent by the third user equipment, wherein a subframe indicated by subframe information of the first scheduling assignment signal comprises the subframe i, and wherein a value of i is one or more integers in integers 1 to N.

* * * * *